United States Patent [19]

Bessinger et al.

[11] Patent Number: 5,020,860

[45] Date of Patent: Jun. 4, 1991

[54] METHODS AND APPARATUS FOR MAINTAINING LONGWALL FACE ALIGNMENT

[75] Inventors: Stephen L. Bessinger, Morgantown, W. Va.; Michael G. Nelson, Fairbanks, Ak.

[73] Assignee: Consolidation Coal Company, Pittsburgh, Pa.

[21] Appl. No.: 484,835

[22] Filed: Feb. 26, 1990

Related U.S. Application Data

[63] Continuation-in-part of Ser. No. 264,670, Oct. 31, 1988, abandoned.

[51] Int. Cl.$^5$ .................. F21D 23/14; G01B 7/00
[52] U.S. Cl. ................................ 299/1; 342/126; 364/420; 364/560
[58] Field of Search .................. 299/1, 30; 342/22, 70, 342/126; 364/424.07, 420, 560; 37/DIG. 1; 175/40

[56] References Cited

U.S. PATENT DOCUMENTS

| | | | |
|---|---|---|---|
| 3,303,499 | 2/1967 | Mahoney et al. | 342/126 X |
| 3,853,185 | 12/1974 | Dahl et al. | 199/1 X |
| 4,234,924 | 11/1980 | LaVance et al. | 342/126 X |
| 4,912,643 | 3/1990 | Beirxe | 37/DIG. 1 X |

FOREIGN PATENT DOCUMENTS 3806224 9/1989 Fed. Rep. of Germany .......... 299/1

Primary Examiner—Ramon S. Britts
Assistant Examiner—David J. Bagnell
Attorney, Agent, or Firm—Alan N. McCartney

[57] ABSTRACT

Mine panel alignment is controlled by recording the electromagnetic phase modulation and/or signal attenuation between spaced distant transceivers in the panel and a transceiver on a cutting machine to measure the distance between the transceivers. Through trilateration, the position of the cutting machine with respect to the known fixed locations can be determined and adjustments made to the cutting machine functions to maintain desired panel alignment.

12 Claims, 2 Drawing Sheets

METHODS AND APPARATUS FOR MAINTAINING LONGWALL FACE ALIGNMENT

This application is a continuation-in-part of U.S. patent application Ser. No. 264,670 filed Oct. 31, 1988, now abandoned.

BACKGROUND OF THE INVENTION

1. Field of the Invention

This invention relates to controlling the functions of a longwall miner in response to measurement of the coal panel face alignment by electromagnetic trilateration.

2. Summary of the Prior Art

Proper maintenance of face alignment to the axis of the panel is important in maximizing productivity in longwall coal mining. Misalignment can result in kinking the face conveyor into angularly disposed sections making the face conveyor difficult to operate. Further, misalignment to the panel axis will require taper cuts resulting in significant loss of productivity.

In the operating sequence of a longwall miner, the operating face is sequentially advanced through the coal seam. Each section of face conveyor is connected to a powered roof support by a double-acting hydraulic cylinder or ram. After the coal in front of a given face conveyor section is mined, its corresponding roof support is lowered and advanced and then hydraulically "set" against the roof, with the face conveyor section then being advanced. U.S. Pat. No. 4,228,508 illustrates such a longwall mining system.

As the face advances, it frequently becomes misaligned, as different face conveyor sections advance by different amounts. This is caused by a wide variety of intervening circumstances, such as operator error, buildup of floor debris, uneven floor or roof, and deteriorating performance of miner hydraulic components. Misalignment is detrimental to operation of the face conveyor and has been known to result in broken conveyor chains and damaged drive components. Misalignment must be corrected by taper cutting, carefully positioning the face conveyor section by section, so that the taper cut produces a straight face.

Automatic control of face alignment has been the object of much research in Great Britain and France, and several systems have been operated underground. However, each system has had serious difficulty in making consistently accurate measurement of face alignment. There are two general approaches to making this measurement, and each has inherent weaknesses in the operating systems.

The first approach measures the relative position of each shield at a given point in the mining cycle. Some use instrumented advance rams; some measure transit time of reflected light or sound between the passing shearer and targets on the supports or vice versa. In all its forms, this approach requires the installation, calibration, and maintenance of a large number of instruments, a difficult task at best on an operating longwall. In addition, the energy-reflecting methods suffer from the dust and suspended water always present in the ambient air in a longwall face.

The second approach measures the orientation of the shearer as it traverses the face. Since the shearer travels on the face conveyor, its trajectory is a virtual trace of the face line. Some methods have attempted to measure absolute orientation, using a magnetometer; others have measured relative orientation, using a gyroscope or an optical "angle cart" which referenced to the previous pan section. The primary difficulty with all these approaches has been the maintenance of the instruments, most of which have moving parts, mounted on the shearer, where they experience high vibration and severe shock. Even when instruments have survived, it has been difficult to maintain calibration.

Besides the drawbacks which are unique to each approach, there is another problem common to both: in every case, only the relative alignment of the face conveyor is measured, and some secondary method must be used to measure the absolute position of the face in geodetic or mine coordinate systems. To date, the most successful method of doing this has been the "lost-cord" method, in which a steel cable is anchored in the gob and its play-out is measured as the face advances. The method has limited accuracy, and requires careful maintenance. Broken cables, which occur regularly, must be replaced immediately.

SUMMARY OF THE INVENTION

It is the purpose of this invention to maintain proper face alignment of a longwall shearing machine (shearer) as the shearer advances sequentially through the mineralized ore zone.

It is an object of this invention to utilize electromagnetic radio waves transmitted through the mineral bed from spaced known locations to a receiver on the shearer and through repeated measurement of the phase modulation of the waves, determination can be made of the shearer location. Adjustments can thereafter be made to face alignment for a given pass to maintain face alignment.

DESCRIPTION OF THE PREFERRED EMBODIMENT

Figure 1:
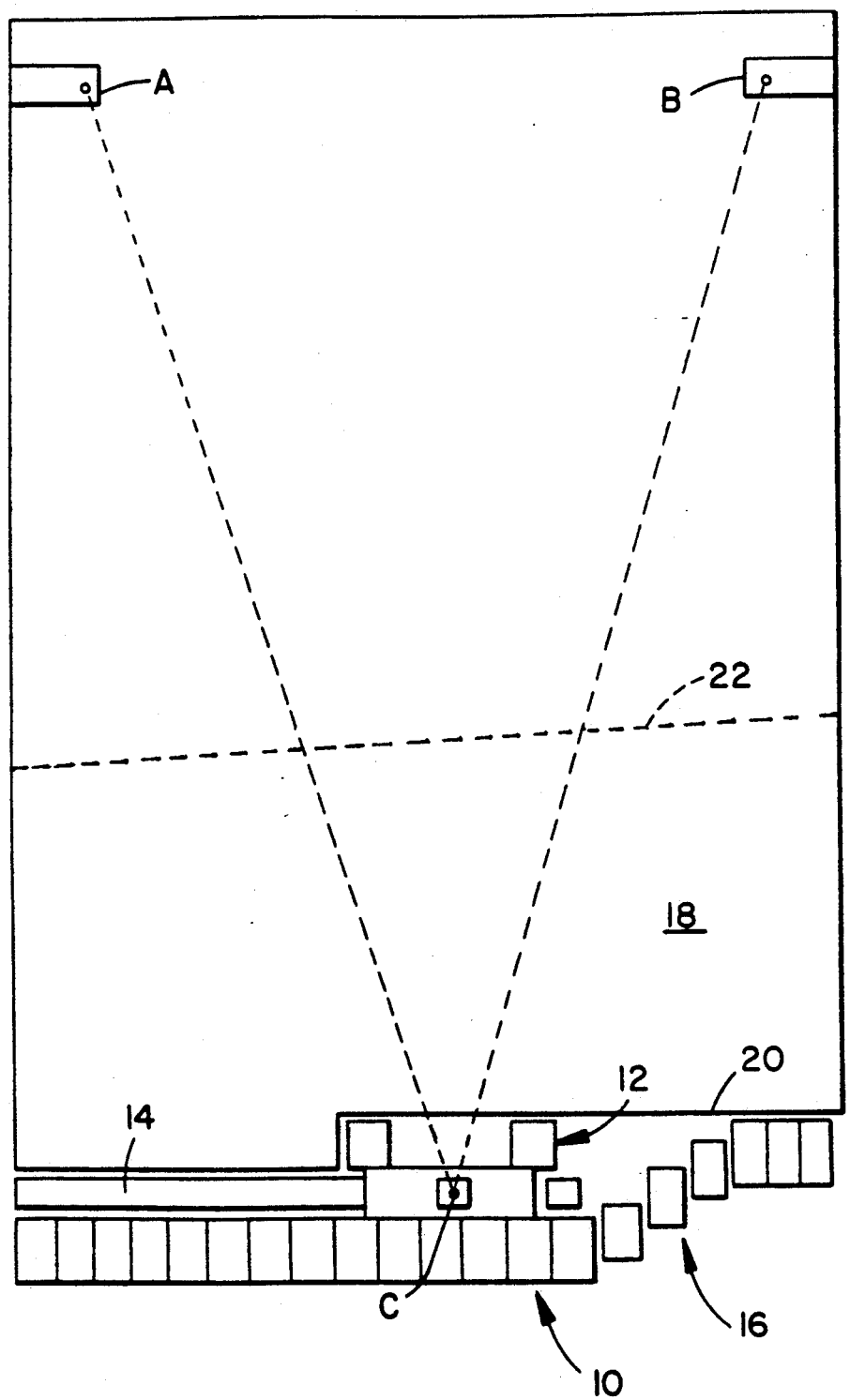
FIG. 1 is a diagrammatic illustration of the longwall shearer advancing through a mineral bed and illustrating the face alignment system of this invention; and, FIG. 2 is a schematic block diagram of the control system of this invention, with the broken lines indicating radio communication and the solid lines indicating hard-wire electrical connection.

Attention is now directed to FIG. 1 which illustrates the longwall system 10 having a shearer 12 (carried on face conveyor 14) and roof supports 16. As the longwall system 10 advances through the panel 18, the self advancing roof supports 16 advance toward the face 20 in a well-known manner.

Should the longwall system become misaligned as it advances through the panel (as illustrated by broken line 22), taper cuts may be necessary to realign the longwall system which would decrease the longwall system output. In the system of this invention, face alignment is measured by electromagnetic trilateration. As shown in FIG. 1, two transceivers, A and B, are installed in holes with known locations in a global or local system. A third transceiver, C, is mounted on the shearer. The length of lines AC and BC are determined by measuring phase modulation of radio frequency waves transmitted along those respective paths. Then, by trilateration, the position of the shearer relative to known locations A and B is calculated. This measurement is repeated and recorded as frequently as required while the shearer traverses the face, providing an absolute image of the face conveyor's position and alignment for each pass. These images may be displayed or printed, to allow for manual adjustment of face alignment, or they may be entered as control data into a computer which controls the roof supports.

Figure 2:
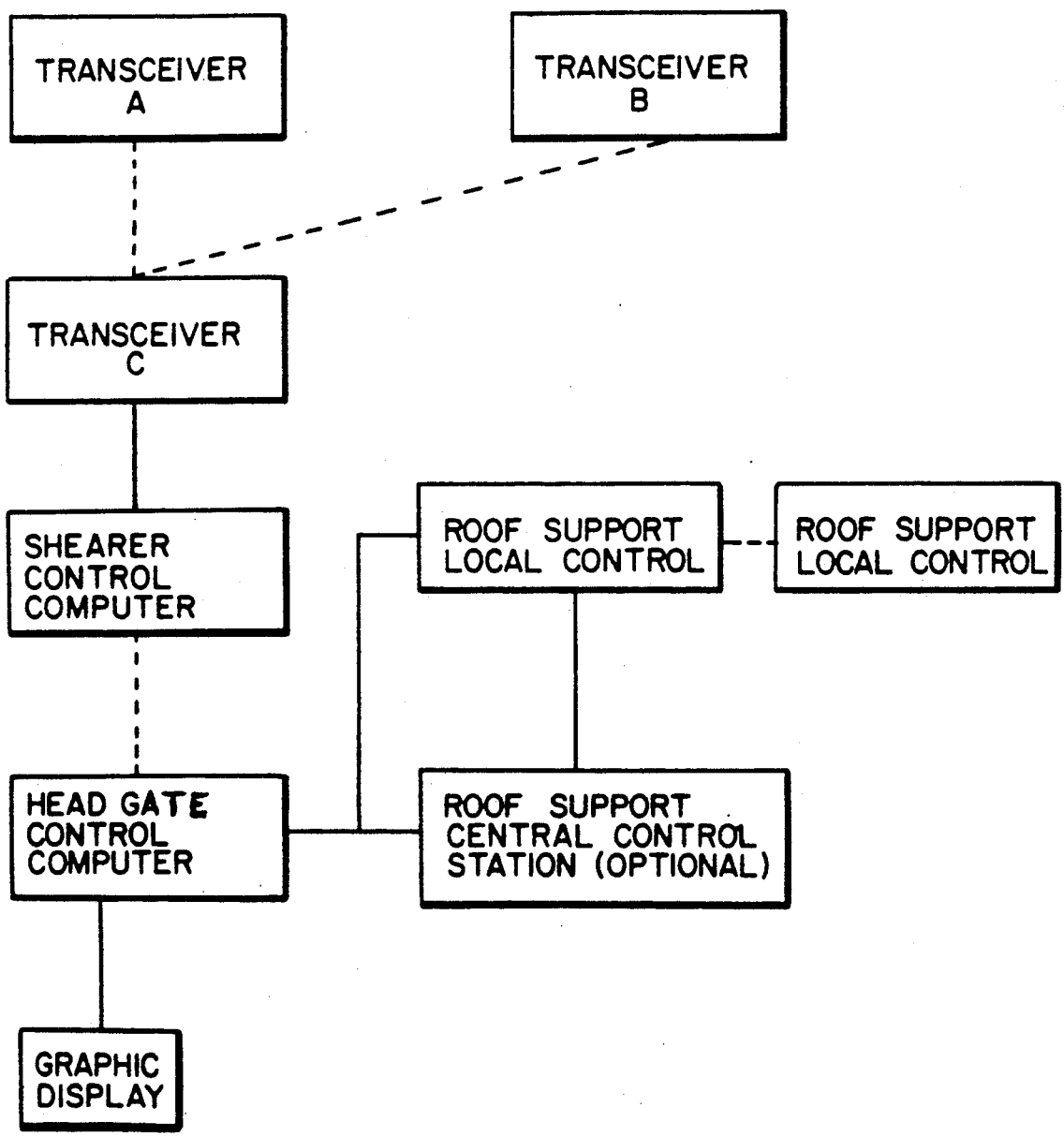

Attention is now directed to FIG. 2 which illustrates a diagram of the alignment control.

The measured distances AC, BC are recorded in the shearer control computer, which also measures shearer location along the longwall face. The shearer control computer periodically transmits a coded message to the headgate control computer, over a radio-frequency data link. The coded message normally contains the following information.. shearer tram speed, shearer direction of travel, shearer location along the face, and respective distance of shearer from transceivers A and B. Using the distance measurements, the headgate control computer calculates by trilateration the absolute coordinates of the shearer at each message transmission point. These calculated coordinates are correlated with the shearer's position at each transmission, and an alignment profile of the face is generated for each shearer pass. Alternately, the phase shift between arrivals of an electromagnetic wave from transceiver C radiating to transceivers A and B, which are locked into phase coherence, can be used to locate the shearing machine and its trajectory.

For closed-loop control, the headgate control computer uses the calculated alignment profile to control the advance of the powered face supports and face conveyor and correct face alignment as desired. This control may be exercised through a roof support central-control station, or directly to the local control on each roof support (See FIG. 2). Alternately, open-loop control may be achieved by programming the headgate control computer to show a face alignment graphic display at the beginning of each pass. This display would provide guidance to shield operators in advancing the shields.

This system is a significant improvement over existing face alignment systems in that is allows measurement of both absolute face position and relative face alignment with the same instrument system.

This invention can be used with other mining techniques such as continuous mining systems, tunneling systems and road headers when face alignment, panel alignment or tunnel/roadway alignment is important to maintaining optimum ore recovery.

We claim:

1. In the mining of a longwall panel, the method of maintaining panel face alignment by controlling the functions of a longwall mining system which includes a shearer, comprising:
   a) placing spaced transceivers at known locations in the panel ahead of the shearer and placing a transceiver on the shearer;
   b) providing electromagnetic communication between each of the spaced transceivers and the transceivers on the shearer;
   c) measuring the phase modulation of the communication between the spaced transceivers and the transceivers on the shearer;
   d) repeating and recording the phase modulation in a controller of the longwall mining system's functions; and,
   e) controlling longwall mining system functions as required to maintain face alignment.

2. The method of claim 1 wherein the longwall mining system includes roof support shields and including the step of controlling the function of the roof support shields.

3. Apparatus for maintaining proper face alignment of a coal panel mined by a longwall mining system which includes a shearer and advancing roof support shields, comprising:
   a) spaced transceivers at known locations with respect to the panel face,
   b) a transceiver on the shearer in electromagnetic communication with each of said spaced transceivers;
   c) a control computer measuring the distance between each of said spaced transceivers and the transceiver on the shearer by repeatedly recording the phase modulation of the communication between said spaced transceivers and said transceiver on the shearer and by trilateration determining shearer location with respect to said spaced transceivers; and
   d) means receiving instructions from said control computer to control the functions of the longwall mining system to maintain panel face alignment.

4. The apparatus of claim 3 wherein said means is a headgate control computer.

5. The apparatus of claim 4 wherein said means includes a graphic display of face alignment.

6. The apparatus of claim 3 wherein said means controls the position of the roof support shields.

7. In the mining of a longwall panel, the method of maintaining panel face alignment by controlling the functions of a longwall mining system which includes a shearer, comprising:
   a) placing spaced transceivers at known locations in the panel ahead of the shearer and placing a transceiver on the shearer;
   b) providing electromagnetic communication between each of the spaced transceivers and the transceivers on the shearer;
   c) measuring the signal attenuation of the communication between the spaced transceivers and the transceivers on the shearer;
   d) repeating and recording the signal attenuation in a controller of the longwall mining system's functions; and,
   e) controlling longwall mining system functions as required to maintain face alignment.

8. The method of claim 7 wherein the longwall system includes roof support shields and including the step of controlling the function of the roof support shields.

9. Apparatus for maintaining proper face alignment of a coal panel mined by a longwall mining system which includes a shearer and advancing roof support shields, comprising:
   a) spaced transceivers at known locations with respect to the panel face,
   b) a transceiver on the shearer in electromagnetic communication with each of said spaced transceivers;
   c) a control computer measuring the distance between each of said spaced transceivers and the transceiver on the shearer by repeatedly recording the signal attenuation of the communication between said spaced transceivers and said transceiver on the shearer and by trilateration determining shearer location with respect to said spaced transceivers; and d) means receiving instructions from said control computer to control the functions of the longwall mining system to maintain panel face alignment.

10. The apparatus of claim 9 wherein said means is a headgate control computer.

11. The apparatus of claim 10 wherein said means includes a graphic display of face alignment.

12. The apparatus of claim 9 wherein said means controls the position of the roof support shields.

* * * * *